US012085666B2

(12) United States Patent
Sumiya et al.

(10) Patent No.: US 12,085,666 B2
(45) Date of Patent: Sep. 10, 2024

(54) RADAR DEVICE, IMAGING METHOD, AND IMAGING PROGRAM

(71) Applicant: NEC Corporation, Tokyo (JP)

(72) Inventors: Tatsuya Sumiya, Tokyo (JP); Masayuki Ariyoshi, Tokyo (JP); Kazurnine Ogura, Tokyo (JP); Taichi Tanaka, Tokyo (JP); Daisuke Ikefuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 446 days.

(21) Appl. No.: 17/622,300

(22) PCT Filed: Jun. 28, 2019

(86) PCT No.: PCT/JP2019/025791
§ 371 (c)(1),
(2) Date: Dec. 23, 2021

(87) PCT Pub. No.: WO2020/261525
PCT Pub. Date: Dec. 30, 2020

(65) Prior Publication Data
US 2022/0260673 A1    Aug. 18, 2022

(51) Int. Cl.
*G01S 7/02* (2006.01)
*G01S 13/32* (2006.01)
*G01S 13/89* (2006.01)

(52) U.S. Cl.
CPC .............. *G01S 7/027* (2021.05); *G01S 13/32* (2013.01); *G01S 13/89* (2013.01)

(58) Field of Classification Search
CPC ........ G01S 7/415; G01S 13/56; G01S 13/726; G01S 7/356; G01S 7/354; G01S 13/583;
(Continued)

(56) References Cited

U.S. PATENT DOCUMENTS

| H1720 H  * | 4/1998 | Chen ....................... G01S 13/89 |
| | | 342/25 |
| 2006/0028369 A1* | 2/2006 | Rausch ................. G01S 13/888 |
| | | 342/107 |

(Continued)

FOREIGN PATENT DOCUMENTS

| CN | 108693526 A | 10/2018 |
| JP | 2001-074832 A | 3/2001 |

(Continued)

OTHER PUBLICATIONS

International Search Report for PCT Application No. PCT/JP2019/025791, mailed on Oct. 1, 2019.
(Continued)

*Primary Examiner* — Olumide Ajibade Akonai
(74) *Attorney, Agent, or Firm* — Sughrue Mion, PLLC

(57) ABSTRACT

The radar device 10 includes radar signal transmission and receiving means 11 for obtaining radar signals, based on reflected waves received by a plurality of receiving antennas, movement estimation means 12 for estimating a movement of an object that may appear in a radar image, movement discretization means 13 for discretizing the estimated movement, signal dividing means 14 for dividing the radar signals into a plurality of groups, Fourier transform processing means 15 for applying Fourier transform to the radar signals of each of the groups, phase-compensation and synthesis processing means 16 for synthesizing results of the Fourier transform after performing phase compensation corresponding to the movement of the object on the results of the Fourier transform, and imaging processing means 17 for generating the radar image from the synthesized result of the Fourier transform.

16 Claims, 12 Drawing Sheets

(58) Field of Classification Search
CPC ........ G01S 13/584; G01S 13/89; G01S 17/42;
G01S 13/04; G01S 7/52028; G01S
13/931; G01S 13/42; G01S 7/2883; G01S
13/582; G01S 7/493; G01S 13/9029;
G01S 15/8904; G01S 13/90; G01S 13/32
See application file for complete search history.

(56) References Cited

U.S. PATENT DOCUMENTS

| | | | |
|---|---|---|---|
| 2007/0139248 | A1 | 6/2007 | Baharav et al. |
| 2010/0245152 | A1* | 9/2010 | Krikorian ................ G01S 13/89 342/28 |
| 2011/0025545 | A1* | 2/2011 | Cook ................ G01S 13/5242 342/22 |
| 2012/0200446 | A1* | 8/2012 | Shirakawa ................ G01S 7/40 342/27 |
| 2016/0131752 | A1 | 5/2016 | Jansen et al. |
| 2017/0146638 | A1* | 5/2017 | Aoyama ................ G01S 7/288 |
| 2018/0284256 | A1 | 10/2018 | Sutou et al. |
| 2019/0235066 | A1 | 8/2019 | Iida et al. |
| 2020/0256980 | A1* | 8/2020 | Bagdonat ................ G01S 7/415 |
| 2022/0011427 | A1* | 1/2022 | Schwert ................ G01S 7/2926 |

FOREIGN PATENT DOCUMENTS

| | | |
|---|---|---|
| JP | 2007-163474 A | 6/2007 |
| JP | 2007-173474 A | 7/2007 |
| JP | 2007-256171 A | 10/2007 |
| JP | 2015-210125 A | 11/2015 |
| JP | 2017-096868 A | 6/2017 |
| JP | 2018-072014 A | 5/2018 |
| WO | 2017/057056 A1 | 4/2017 |

OTHER PUBLICATIONS

English translation of Written opinion for PCT Application No. PCT/JP2019/025791, mailed on Oct. 1, 2019.

X. Zhunge et al., "Three-Dimensional Near-Field MIMO Array Imaging Using Range Migration Techniques", IEEE Transactions on Image Processing, vol. 21, No. 6, pp. 3026-3033, Jun. 2012, pp. 3026-3033.

B. D. Lucas et al., "An Iterative Image Registration Technique with an Application to Stereo Vision", Proc. 7th International Joint Conference on Artificial Intelligence, pp. 121-130, 1981.

Yamamoto Kazuhiko et al., "A New Phase Compensation Algorithm for a Doppler Radar Imaging", Proceedings of IEICE, Oct. 25, 2000, vol. J83-B, No. 10, pp. 1453-1461, ISSN 1344-4697.

Japanese Office Communication for JP Application No. 2021-528818 mailed on Oct. 4, 2022 with English Translation.

Sakamoto et al., "Target Speed Estimation using Revised Range Point Migration for Ultra Wideband Radar Imaging", 2013 7th, European Conference on Antennas and Propagation (EuCAP), U.S., IEEE, Jun. 24, 2013.

* cited by examiner (A)    (B)

RADAR DEVICE, IMAGING METHOD, AND IMAGING PROGRAM

This application is a National Stage Entry of PCT/JP2019/025791 filed on Jun. 28, 2019, the contents of all of which are incorporated herein by reference, in their entirety.

TECHNICAL FIELD

The present invention relates to a radar system, an imaging method, and an imaging program for receiving electromagnetic waves reflected by an object and performing imaging.

BACKGROUND ART

A radar device that realizes a body scanner have been introduced in airports and the like. The radar device irradiates electromagnetic waves such as millimeter waves to an object (for example, a human body) that stops in a predetermined area. In the body scanner system, imaging is performed based on the electromagnetic wave (radar signal) reflected by the object, and a radar image is generated. Based on the radar image, for example, an inspection is performed to determine whether or not the object has a suspicious object.

Non-patent literature 1 describes a method of generating radar images from radar signals using Fast Fourier Transform (FFT).

Non-patent literature 2 describes a method for estimating an optical flow between image frames to measure velocity, etc., of an object in an image.

CITATION LIST

Non Patent Literature

NPL 1: X. Zhunge et al., "Three-Dimensional Near-Field MIMO Array Imaging Using Range Migration Techniques", IEEE Transactions on Image Processing, Vol. 21, No. 6, pp. 3026-3033, June 2012

NPL 2: B. D. Lucas et al., "An Iterative Image Registration Technique with an Application to Stereo Vision", Proc. 7th International Joint Conference on Artificial Intelligence, pp. 674-679, 1981

SUMMARY OF INVENTION

Technical Problem

FIG. 16 is a block diagram showing an example configuration of a general radar device. The radar device 800 shown in FIG. 16 comprises a radar signal transmission and receiving unit 101 that controls the emission of electromagnetic waves (specifically, timing of emission, etc.) of a transmission antenna (Tx) 801 that emits electromagnetic waves, and inputs radar signals from a receiving antenna (Rx) 802 that receives reflected waves from an object, a Fourier transform processing unit 805 that applies Fourier transform to the radar signals with respect to the coordinates of the antennas, and an imaging processing unit 807 that generates a radar image from the result of the Fourier transform. Note that although one transmission antenna 801 and one receiving antenna 802 are illustrated in FIG. 16, practically, a plurality of transmission antennas 801 and a plurality of receiving antennas 802 are installed.

The radar device 800 generates a radar image based on the assumption that the object is stationary when it is irradiated with electromagnetic waves. Therefore, when the object moves, a blur (blurredness) may occur in the radar image.

It is an object of the present invention to provide a radar device, an imaging method and an imaging program that can suppress the occurrence of blurredness in a radar image caused by the movement of an object or the like.

Solution Problem

A radar device according to the present invention includes radar signal transmission and receiving means for obtaining radar signals, based on reflected waves received by a plurality of receiving antennas, movement estimation means for estimating a movement of an object that may appear in a radar image, movement discretization means for discretizing the estimated movement, signal dividing means for dividing the radar signals into a plurality of groups, Fourier transform processing means for applying Fourier transform to the radar signals of each of the groups, phase-compensation and synthesis processing means for synthesizing results of the Fourier transform after performing phase compensation corresponding to the movement of the object on the results of the Fourier transform, and imaging processing means for generating the radar image from the synthesized result of the Fourier transform.

An imaging method according to the present invention includes obtaining radar signals, based on reflected waves received by a plurality of receiving antennas, estimating a movement of an object that may appear in a radar image, discretizing the estimated movement, dividing the radar signals into a plurality of groups, applying Fourier transform to the radar signals of each of the groups, synthesizing results of the Fourier transform after performing phase compensation corresponding to the movement of the object on the results of the Fourier transform, and generating the radar image from the synthesized result of the Fourier transform.

An imaging program according to the present invention causes a computer to execute a process of obtaining radar signals, based on reflected waves received by a plurality of receiving antennas, a process of estimating a movement of an object that may appear in a radar image, a process of discretizing the estimated movement, a process of dividing the radar signals into a plurality of groups, a process of applying Fourier transform to the radar signals of each of the groups, a process of synthesizing results of the Fourier transform after performing phase compensation corresponding to the movement of the object on the results of the Fourier transform, and a process of generating the radar image from the synthesized result of the Fourier transform.

Advantageous Effects of Invention

According to the present invention, it is possible to suppress the occurrence of blurredness in a radar image caused by the movement of an object or the like.

DESCRIPTION OF EMBODIMENTS

Hereinafter, example embodiments of the present invention are described with reference to the drawings.

Example Embodiment 1

Figure 1:
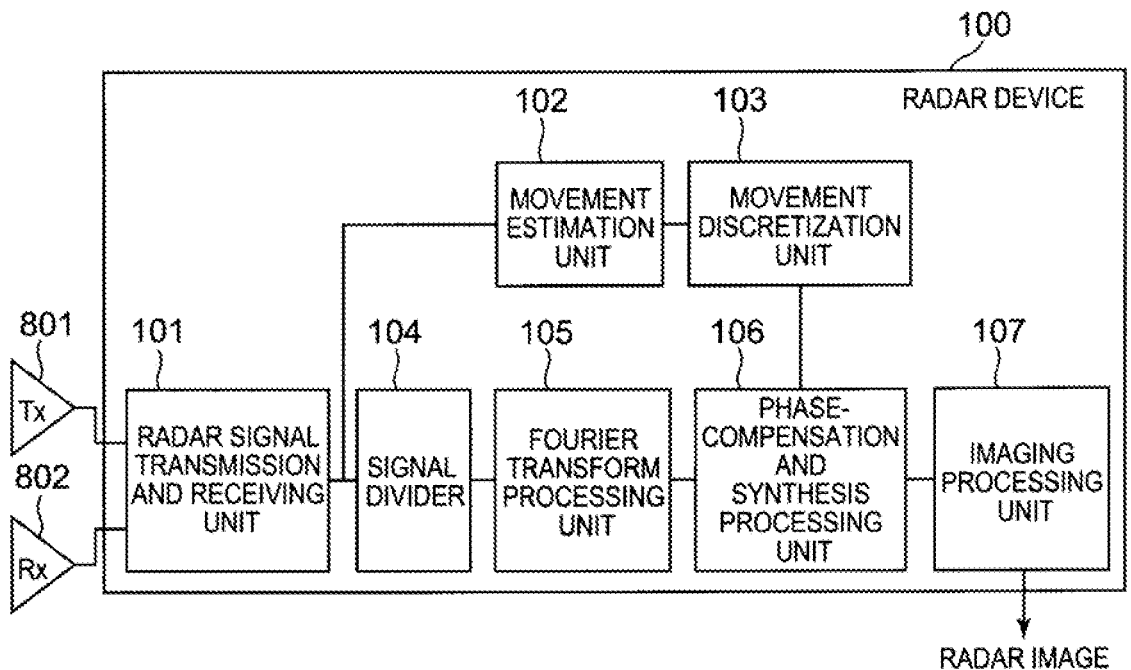
FIG. 1 It depicts a block diagram showing a configuration example of the radar device of the first example embodiment.

FIG. 1 is a block diagram showing a configuration example of the radar device of the first example embodiment. The radar device 100 of the first example embodiment comprises a radar signal transmission and receiving unit 101 that controls the emission of electromagnetic waves (specifically, timing of emission, etc.) of a transmission antenna (Tx) 801 that emits electromagnetic waves such as millimeter waves, and inputs radar signals from a receiving antenna (Rx) 802 that receives reflected waves from an object that may appear in a radar image, a movement estimation unit 102 that estimates the movement of the object, a movement discretization unit 103 that discretizes the movement of the object, a signal divider 104 that divides the radar signals into a plurality of groups, a Fourier transform processing unit 105 that applies Fourier transform to the radar signals of each group, a phase-compensation and synthesis processing unit 106 that performs phase compensation of each result of the Fourier transform by an amount calculated from the output of the movement discretization unit 103 and then synthesizes each result of the Fourier transform to obtain a single result of the Fourier transform, and an imaging processing unit 107 that generates a radar image from the result of the Fourier transform.

Figure 2:
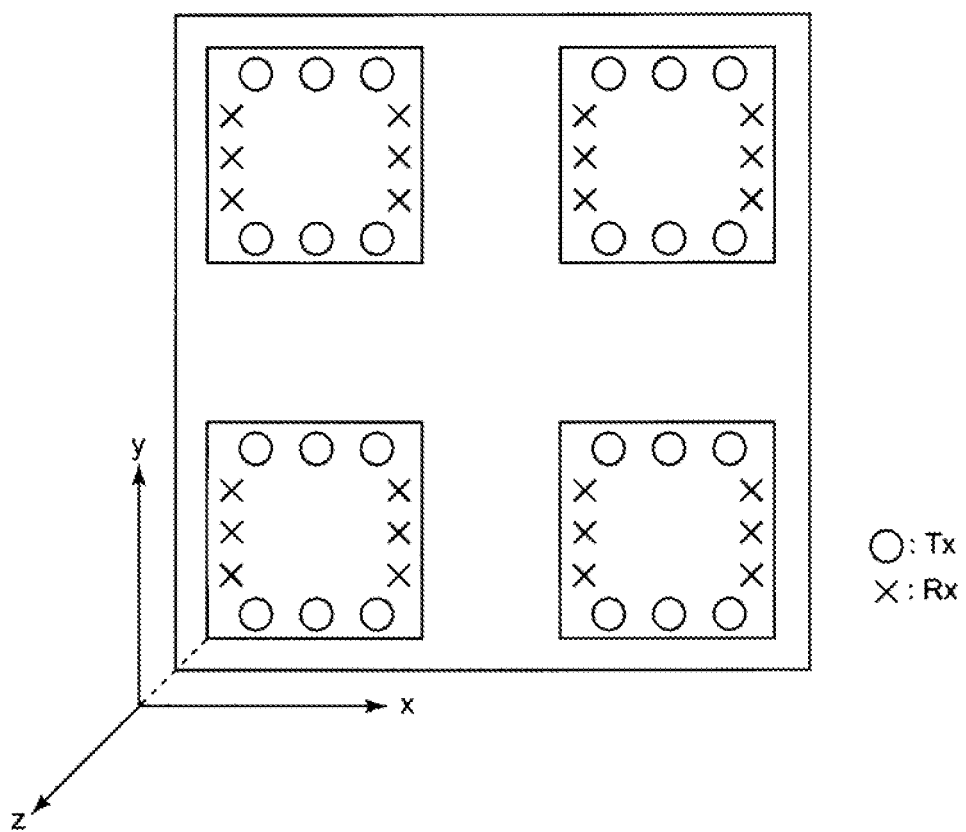
FIG. 2 It depicts a schematic diagram showing an example of the antenna arrangement in an electronically scanned array including a transmission antenna and a receiving antenna.

FIG. 2 is a schematic diagram showing an example of the antenna arrangement in an electronically scanned array including a plurality of transmission antennas 801 and a plurality of receiving antenna 802. Note that a three-dimensional coordinate system is also shown in FIG. 2. The electronically scanned array comprises, for example, Multiple-Input and Multiple-Output (MIMO) in which a plurality of transmission antennas transmits signals of the same frequency. The electronically scanned array may comprise a monostatic transmission and receiving antenna element in which a transmission antenna 801 and a receiving antenna 802 are common. The electronically scanned array may also comprise a multi-static antenna in which one or more other receiving antennas receive a signal irradiated by a particular transmission antenna.

For example, a continuous wave (CW), a frequency modulated CW (FMCW), and a stepped FMCW can be used as electromagnetic waves irradiated by the transmission antenna 801.

Figure 3:
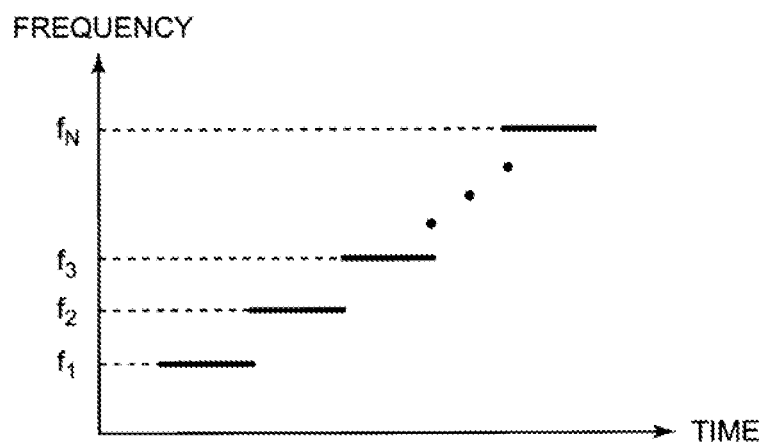
FIG. 3 It depicts an explanatory diagram showing a signal irradiated by a transmission antenna.

In this example embodiment, it is assumed that Stepped FMCW as shown in FIG. 3, whose frequency changes according to time, is used. The time index is n (n: 1 to N), and the frequency is denoted as f(n).

The radar signal transmission and receiving unit 101 controls the transmission (emission) of electromagnetic waves by the transmission antennas 801 and inputs radar signals based on reflected waves received from an object by the receiving antennas 802. The radar signal transmission and receiving unit 101 also controls the order in which the plurality of transmission antennas 801 emit the electromagnetic waves to avoid interference of the electromagnetic waves.

The receiving antenna 802 measures complex amplitude (a complex number representing amplitude and phase shift from the transmitted wave) of the reflected wave for each frequency, and defines the measurement result as the radar signal.

The radar signal transmitted from the transmission antenna 801 at the coordinates ($x_T$, $y_T$, 0) with the wave number k and received by the receiving antenna 802 at the coordinates ($x_R$, $y_R$, 0) is s ($x_T$, $y_T$, $x_R$, $y_R$, k). Further, the time (irradiation start time) when the transmission antenna 801 at the coordinates ($x_T$, $y_T$, 0) starts irradiating the electromagnetic wave is defined as $t_{emit}(x_T, y_T)$. Note that the wave number k of the electromagnetic wave is k=2πf/c, wherein the frequency is f and the speed of light is c. The plurality of transmission antennas 801 irradiate electromagnetic waves according to the order and period of irradiating the electromagnetic waves. The radar signal transmission and receiving unit 101 obtains the irradiation start time $t_{emit}(x_T, y_T)$ of each of the transmission antennas 801.

The radar signal transmission and receiving unit 101 also obtains the radar signal s($x_T$, $y_T$, $x_R$, $y_R$, k). The radar signal transmission and receiving unit 101 outputs the radar signal s($x_T$, $y_T$, $x_R$, $y_R$, k) and the irradiation start time $t_{emit}$ ($x_T$, $y_T$) of each transmission antenna 801 to the movement estimation unit 102 and the signal divider 104.

Note that the radar signal transmission and receiving unit 101 can know the irradiation start time $t_{emit}(x_T, y_T)$ of each transmission antenna 801 from the irradiation period of the electromagnetic wave of each transmission antenna 801 and the order in which the electromagnetic waves are irradiated. Therefore, the radar signal transmission and receiving unit 101 does not bother obtain the irradiation start time $t_{emit}(x_T, y_T)$. In addition, if the movement estimation unit 102 and the signal divider 104 can recognize in advance the irradiation period of electromagnetic waves of each transmission antenna 801 and the order in which the electromagnetic waves are irradiated, the radar signal transmission and receiving unit 101 does not need to output the irradiation start time $t_{emit}(x_T, y_T)$ of each transmission antenna 801 to the movement estimation unit 102 and the signal divider 104.

Hereinafter, the measurement start time of the radar signal is 0 and the measurement period is $T_{scan}$. The measurement period $T_{scan}$ is, for example, a sum of the periods during which all the transmission antennas 801 irradiate electromagnetic waves. Therefore, the time t during the measurement period is $0 \leq t < T_{scan}$.

The movement estimation unit 102 estimates the movement of the object based on the radar signal $s(x_T, y_T, x_R, y_R, k)$ and the irradiation start time $t_{emit}(x_T, y_T)$ of each transmission antenna 801. In this example embodiment, the movement of the object is treated as displacements in the x and y directions respectively at each time from the measurement start time. The estimated results of the movement of the object are denoted as $dx(t)$ and $dy(t)$.

As an example, the movement estimation unit 102 estimates the movement of an object from a difference between two radar images. For example, the movement estimation unit 102 divides the radar signal into a radar signal obtained in the first half $0 \leq t < T_{scan}/2$ and a radar signal obtained in the second half $T_{scan}/2 \leq t < T_{scan}$, based on the irradiation start time $t_{emit}(x_T, y_T)$. The movement estimation unit 102 generates two radar images using each of the radar signals of the first half and the radar signals of the second half. The movement estimation unit 102 estimates the velocities $v_x$ and $v_y$ of the object in the x and y directions, respectively, from the difference of the two radar images, and the result of the movement estimation is $dx(t)=v_x t$, $dy(t)=v_y t$.

Figure 16:
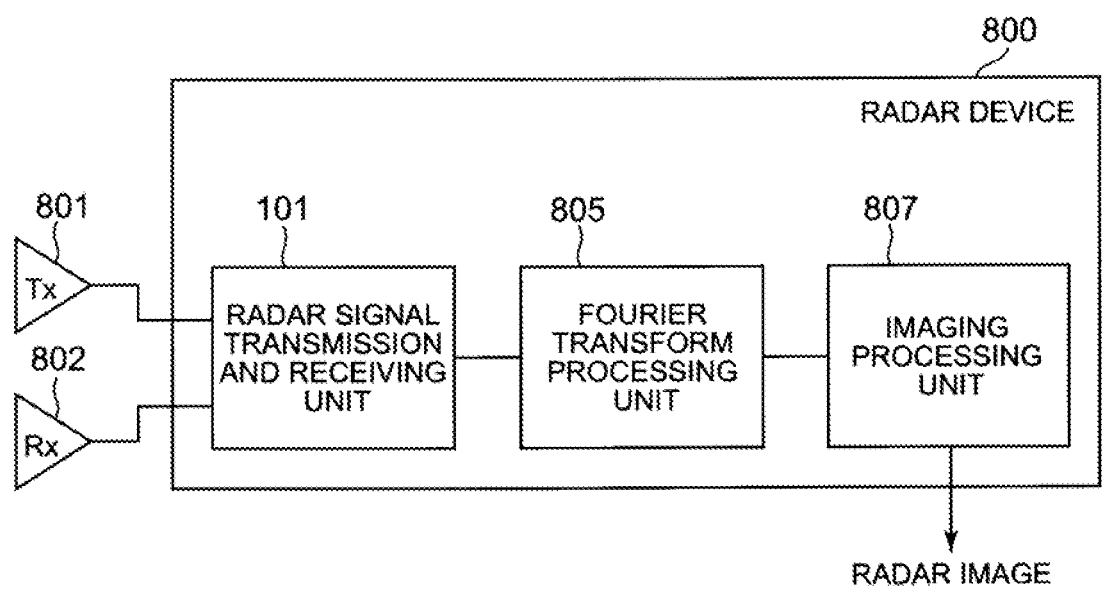
FIG. 16 It depicts a block diagram showing an example configuration of a general radar device.

The movement estimation unit 102 has a function for generating a radar image. As an example, the movement estimation unit 102 may have a function corresponding to the functions performed by the Fourier transform processing unit 805 and the imaging processing unit 807 in a general radar device such as that shown in FIG. 16.

Figure 4:
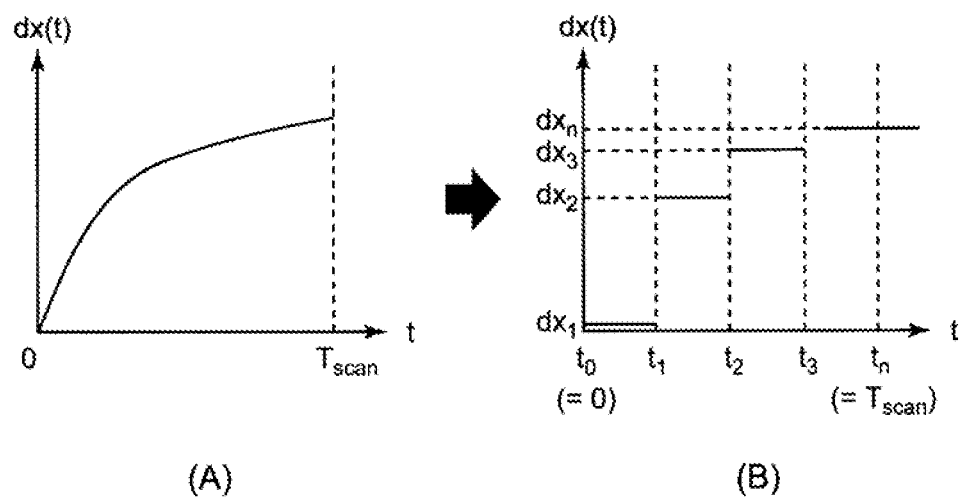
FIG. 4 It depicts an explanatory diagram showing the discretization of the movement of an object.

FIG. 4 is an explanatory diagram showing the discretization of the movement of an object. The movement discretization unit 103 converts the estimated continuous movement of the object into a discrete movement. Specifically, the movement discretization unit 103 calculates parameters for discretizing the estimated results $dx(t)$, $dy(t)$ of the movement of the object as illustrated in (A) of FIG. 4 as a combination of stationary and moving as illustrated in (B) of FIG. 4. Note that only the estimation result $dx(t)$ is illustrated in FIG. 4. The number of divisions n of the measurement period and the points in time $t_0, t_1, \ldots, t_n(t_0=0, t_n=T_{scan})$ (hereinafter, referred to as time of division) when stationary is changed to moving are determined in advance and set them to the movement discretization unit 103. Note that the fact that the number of divisions n and the time of divisions during the measurement period are determined in advance means that each divided section (between a certain time of division and the next time of division) in the measurement period is determined in advance. The number of divisions n and the time of division are also set to the signal divider 104.

One way to set the time of division is to divide the measurement period into n equal parts. In other words, $t_i = T_{scan} \times (i/n)$ is used. Dividing the measurement period into n equal parts is one example, and other methods may be used to set the time of division.

The movement discretization unit 103 calculates, for example, representative values $dx_i$, $dy_i$ of $dx(t)$ and $dy(t)$ in n divided sections $\{\tau | t_{i-1} \leq \tau < t_i\}(i=1, \ldots, n)$ generated by the division. The movement discretization unit 103 outputs the calculated representative values $dx_i$, $dy_i$ to the phase-compensation and synthesis processing unit 106. As an example, the movement discretization unit 103 assumes that the estimated movement results $dx(t)$ and $dy(t)$ at the start time of each section are representative values. That is, the movement discretization unit 103 assumes that $dx_i=dx(t_{i-1})$ and $dy_i=dy(t_{i-1})$. The representative value corresponds to an example of a parameter for discretizing the movement of the object.

The signal divider 104 divides the radar signals $s(x_T, y_T, x_R, y_R, k)$ received from the radar signal transmission and receiving unit 101 into n groups, based on the irradiation start time $t_{emit}(x_T, y_T)$ received from the radar signal transmission and receiving unit 101, the number of divisions n of the measurement period set in advance, and the time of divisions $t_0, t_1, \ldots, t$. In other words, the signal divider 104 groups the radar signals $s(x_T, y_T, x_R, y_R, k)$ with each of the divided sections used by the movement discretization unit 103 as one group. The signal divider 104 outputs the grouped radar signals to the Fourier transform processing unit 105.

Each group $s_i(x_T, y_T, x_R, y_R, k)(i=1, \ldots, n)$ is a data set satisfying $t_{i-1} \leq t_{emit}(x_T, y_T) < t_i$. The data set is expressed as the following equation (1).

[Math. 1]

$$s\_i(x_T, y_T, x_R, y_R, k) = \begin{cases} s(x_T, y_T, x_R, y_R, k) & (t_{i-1} \leq t_{emit}(x_T, y_T) < t_i) \\ 0 & (\text{otherwise}) \end{cases} \quad (1)$$

The Fourier transform processing unit 105 applies 4-dimensional Fourier transform on four variables $(x_T, y_T, x_R, y_R)$ for each data set $s_i(x_T, y_T, x_R, y_R, k)$. The Fourier transform processing unit 105 outputs the result of the 4-dimensional Fourier transform to the phase-compensation and synthesis processing unit 106. Hereafter, the result of the 4-dimensional Fourier transform is denoted as $s'_i(k_{xT}, k_{yT}, k_{xR}, k_{yR}, k)$.

The phase-compensation and synthesis processing unit 106 performs phase compensation for each of the results $s'_i(k_{xT}, k_{yT}, k_{xR}, k_{yR}, k)$ of the 4-dimensional Fourier transform by the amount calculated from the representative values $dx_i$, $dy_i$ of the movement. In other words, the phase-compensation and synthesis processing unit 106 performs phase compensation corresponding to the movement of the object.

The phase-compensation and synthesis processing unit 106 synthesizes the result $s'_i(k_{xT}, k_{yT}, k_{xR}, k_{yR}, k)$ of the 4-dimensional Fourier transform after phase compensation as shown in the following equation (2). The phase-compensation and synthesis processing unit 106 outputs the result $s'(k_{xT}, k_{yT}, k_{xR}, k_{yR}, k)$ of the Fourier transform obtained by the synthesis to the imaging processing unit 107. Note that in the equation (2), $\exp\{j[(k_{xT}+k_{xR})dx_i+(k_{yT}+k_{yR})dy_i]\}$ is a term related to the phase compensation corresponding to the movement of the object.

[Math. 2]

$$s'(k_{xT}, k_{yT}, k_{xR}, k_{yR}, k) = \sum_{i=1}^{n} s'_i(k_{xT}, k_{yT}, k_{xR}, k_{yR}, k)\exp\{i[(k_{xT}+k_{xR})dx_i + (k_{yT}+k_{yR})dy_i]\} \quad (2)$$

The imaging processing unit 107 generates a radar image based on s'($k_{xT}$, $k_{yT}$, $k_{xR}$, $k_{yR}$, k). Note that when generating the radar image, the imaging processing unit 107 can use a method for obtaining a three-dimensional radar image by inverse Fourier transform after transforming the Fourier transform of the five-variable function, s'($k_{xT}$, $k_{yT}$, $k_{xR}$, $k_{yR}$, k) into a three-variable function, as described in non-patent literature 1. However, using that method is only one example, and the imaging processing unit 107 may generate the radar image by other methods.

Figure 5:
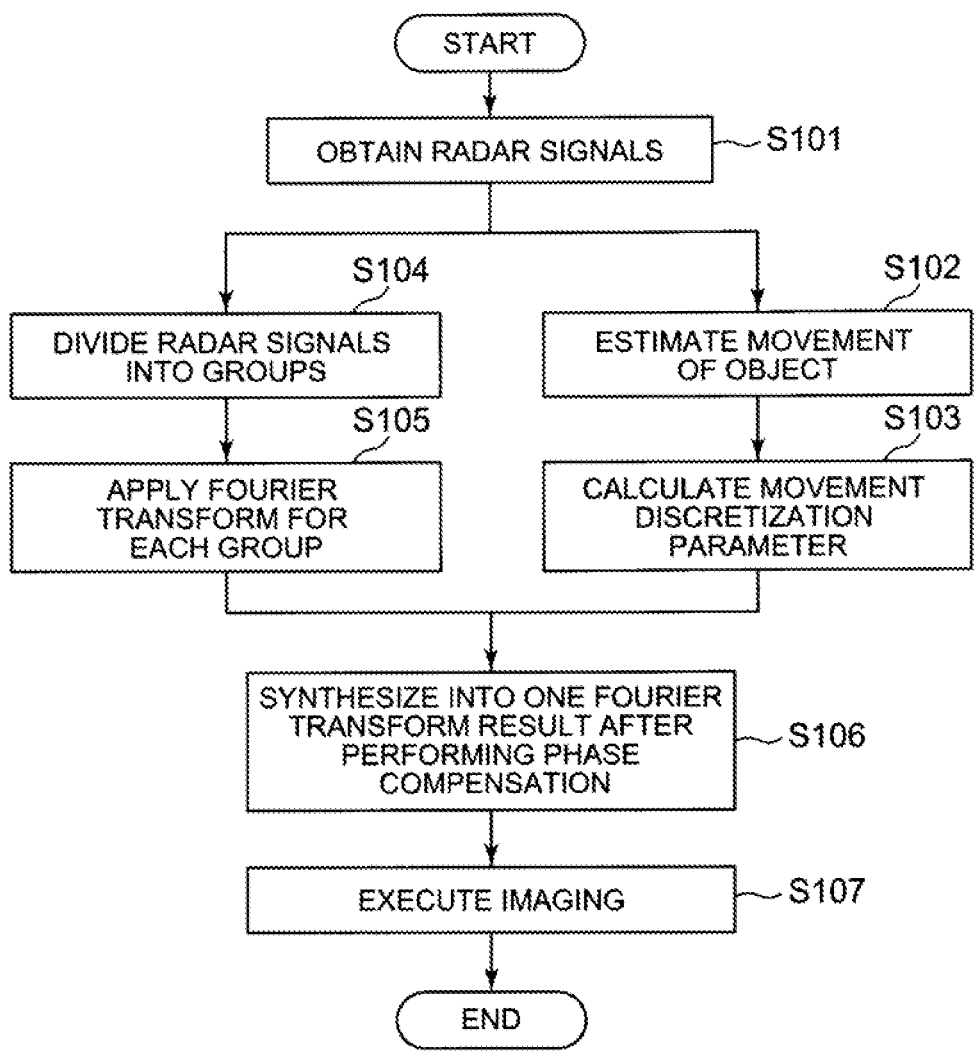
FIG. 5 It depicts a flowchart showing the operation of the radar device of the first example embodiment.

Next, the operation of the radar device 100 will be described with reference to the flowchart of FIG. 5.

The radar signal transmission and receiving unit 101 makes the plurality of transmission antennas 801 to emit electromagnetic waves sequentially according to a predetermined irradiation order, and obtains radar signals s($x_T$, $y_T$, $x_R$, $y_R$, k) based on the reflected waves received by the receiving antennas 802 (step S101). Then, the radar signal transmission and receiving unit 101 outputs the obtained radar signal s($x_T$, $y_T$, $x_R$, $y_R$, k) and the irradiation start time $t_{emit}(x_T, y_T)$ of each transmission antenna 801 to the movement estimation unit 102 and the signal divider 104.

As described above, the movement estimation unit 102 estimates the movement of the object based on the radar signal s($x_T$, $y_T$, $x_R$, $y_R$, k) and the irradiation start time $t_{emit}(x_T, y_T)$ (step S102). The movement estimation unit 102 outputs the movement estimation results dx(t), dy(t) to the movement discretization unit 103.

As described above, the movement discretization unit 103 calculates representative values $dx_i$, $dy_i$ of dx(t), dy(t) in each divided section in order to discretize the estimated results of the movement of the object (step S103). The movement discretization unit 103 outputs the representative values $dx_i$, $dy_i$ to the phase-compensation and synthesis processing unit 106.

As described above, the signal divider 104 groups the radar signals s($x_T$, $y_T$, $x_R$, $y_R$, k) into n groups based on the irradiation start time $t_{emit}(x_T, y_T)$, the number of divisions n of the measurement period, and the time of division $t_0, t_1, \ldots, t_n$ (step S104). The signal divider 104 outputs the grouped radar signals to the Fourier transform processing unit 105.

The Fourier transform processing unit 105 applies the four-dimensional Fourier transform on four variables ($x_T$, $y_T$, $x_R$, $y_R$) for each data set $s_i(x_T, y_T, x_R, y_R, k)$ as described above (step S105). The Fourier transform processing unit 105 outputs the results $s'_i(k_{xT}, k_{yT}, k_{xR}, k_{yR}, k)$ of the Fourier transform to the phase-compensation and synthesis processing unit 106.

The phase-compensation and synthesis processing unit 106 performs phase compensation on the results $s'_i(k_{xT}, k_{xR}, k_{yT}, k_{yR}, k)$ of the Fourier transform as described above, and then synthesizes the results $s'_i(k_{xT}, k_{yT}, k_{xR}, k_{yR}, k)$ of the Fourier transform into s'($k_{xT}$, $k_{yT}$, $k_{xR}$, $k_{yR}$, k) (step S106). The phase-compensation and synthesis processing unit 106 outputs the result s'($k_{xT}$, $k_{yT}$, $k_{xR}$, $k_{yR}$, k) of the Fourier transform obtained by the synthesis to the imaging processing unit 107.

The imaging processing unit 107 generates a radar image from the result of the Fourier transform s'($k_{xT}$, $k_{xR}$, $k_{yT}$, $k_{yR}$, k) (step S107).

Note that the radar image generated by the imaging processing unit 107 is, for example, displayed on a display. It is also possible to perform object detection and the like from the radar image.

As explained above, since the radar device 100 corrects for the effect of the movement of the object, specifically, since the discrete movement of the object in the divided section is reflected in the result of the Fourier transform for each divided section, a high-quality radar image can be generated in which the blurredness caused by the movement of the object is suppressed.

Example Embodiment 2

Figure 6:
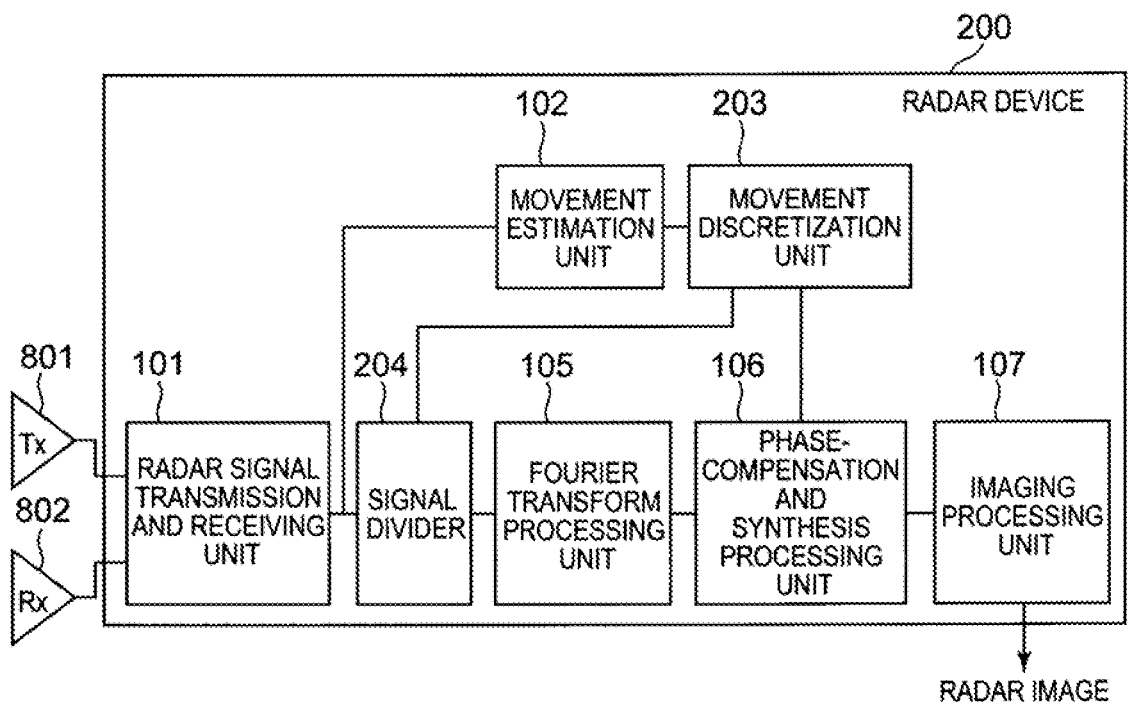
FIG. 6 It depicts a block diagram showing a configuration example of the radar device of the second example embodiment.

FIG. 6 is a block diagram showing a configuration example of the radar device of the second example embodiment. The radar device 200 of the second example embodiment comprises a radar signal transmission and receiving unit 101 that controls the transmission antenna 801 and inputs the radar signal from a receiving antenna 802, a movement estimation unit 102, a movement discretization unit 203 that discretizes the movement of an object, a signal divider 204 that divides the radar signal into a plurality of groups, a Fourier transform processing unit 105, a phase-compensation and synthesis processing unit 106, and an imaging processing unit 107.

The functions of the blocks other than the movement discretization unit 203 and the signal divider 204 are the same as the functions in the first example embodiment.

Figure 7:
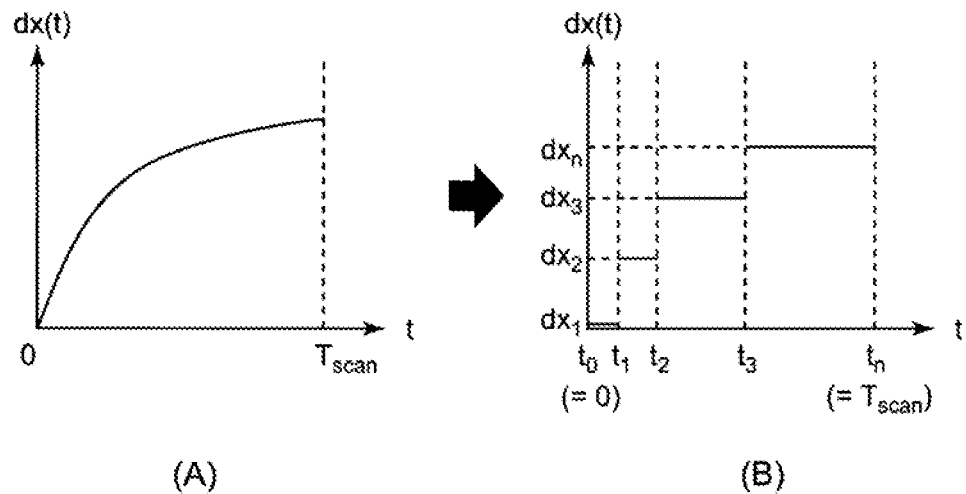
FIG. 7 It depicts an explanatory diagram showing discretization of the movement of an object.

FIG. 7 is an explanatory diagram showing the discretization of the movement of an object. As in the case of the first example embodiment, the movement discretization unit 203 calculates parameters for discretizing the estimated results dx(t) and dy(t) of the movement of the object as illustrated in (A) of FIG. 7 as a combination of stationary and instantaneous movement, as shown in (B) of FIG. 7. Note that only the estimation result dx(t) is illustrated in FIG. 7.

In the first example embodiment, the number of divisions n and the time of divisions $t_0, t_1, \ldots, t_n(t=0, t_n=T_{scan})$ were predetermined, but in this example embodiment, the movement discretization unit 203 calculates the number of divisions n and the time of divisions $t_0, t_1, \ldots, t_n(t=0, t_n=T_{scan})$, based on the estimated results dx(t), dy(t) of the movement of the object.

The signal divider 204 basically performs the same processing as the signal divider 104 in the first example embodiment. However, while the signal divider 104 uses the predetermined number of divisions n and the time of divisions $t_0, t_1, \ldots, t_n$, the signal divider 204 uses the number of divisions n and the time of divisions $t_0, t_1, \ldots, t_n$ calculated by the movement discretizing unit 203 in this example embodiment.

Next, the operation of the radar device 200 will be described with reference to the flowcharts of FIGS. 8 and 9. The processing of steps S101 and S102 is the same as the processing in the first example embodiment.

Figure 9:
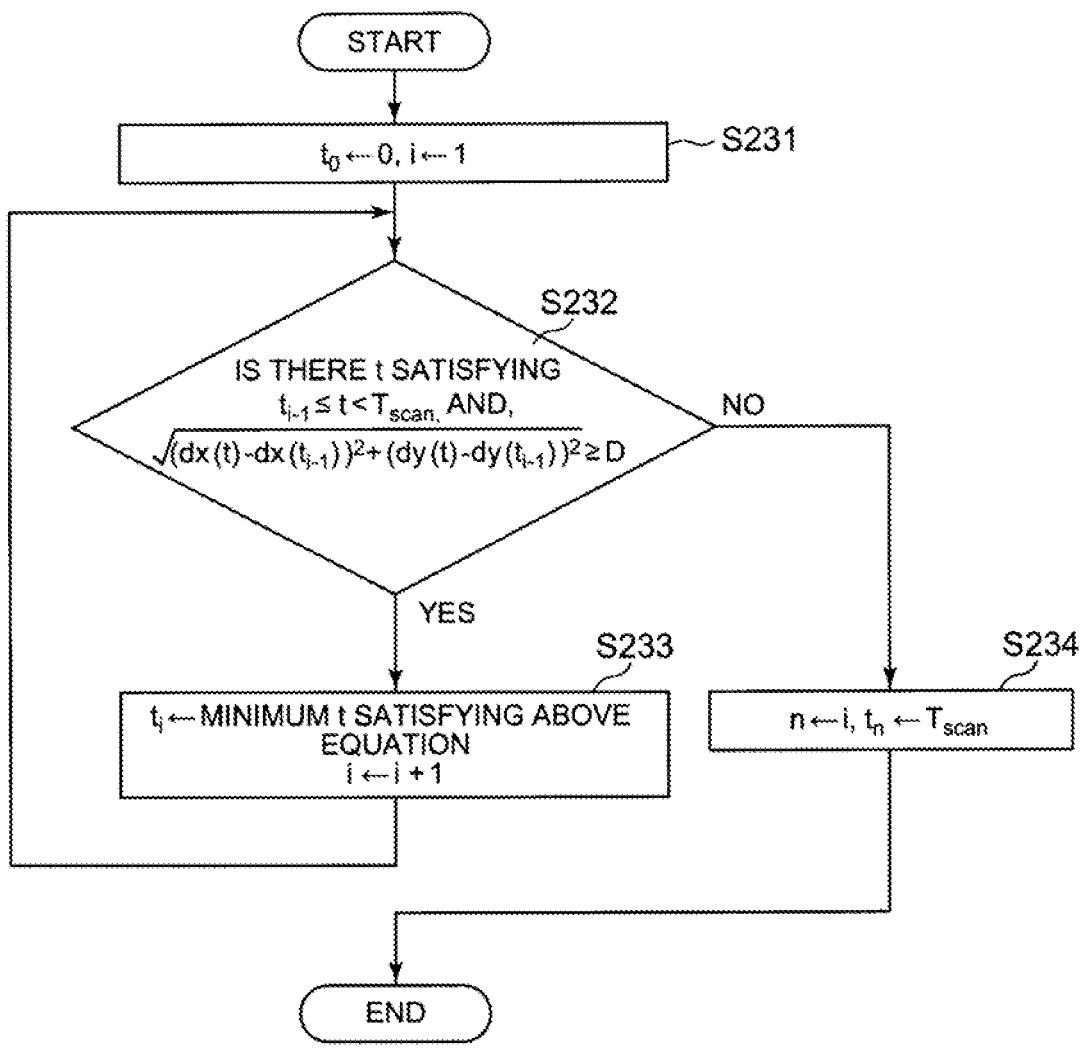
FIG. 9 It depicts a flowchart showing an example of a method for calculating movement discretization parameters.

In step S203, the movement discretization unit 203 calculates parameters for discretizing the estimated result of the movement of the object, as shown in the flowchart of FIG. 9, for example, when the allowable displacement D that can be regarded as stationary is determined.

The movement discretization unit 203 first sets $t_0=0$ and i=1 (step S231).

The movement discretization unit 203 determines whether there is a t satisfying the following equation (3) (step S232).

[Math. 3]

$$t_{i-1} \le t < T_{scan} \text{ and } \sqrt{(dx(t)-dx(t_{i-1}))^2 + (dy(t)-dy(t_{i-1}))^2} \ge D \quad (3)$$

When the movement discretization unit 203 determines that there is t satisfying the equation (3), the movement discretization unit 203 sets the minimum t satisfying the equation (3) to $t_i$, and sets i=i+1 (step S233). Then, the process is returned to step S232.

If there does not exit t satisfying the equation (3), the movement discretization unit 203 sets the value of i at that time to n and sets $T_{scan}$ to $t_n$ (step S234), and terminates the process shown in FIG. 9.

For example, when the desirable number of divisions n is determined due to constraints such as calculation time and upper limit of a used memory, the movement discretization unit 203 may obtain D such that the number of divisions becomes n by a binary search or the like, and adopt a method of division when using the D. The movement discretization unit 203 outputs the set number of divisions n and the time of divisions $t_0, t_1, \ldots, t_n$ to the signal divider 204.

The movement discretization unit 103 outputs the determined number of divisions n and the time of division $t_0, t_1, \ldots, t_n$ to the signal divider 204. In addition, the movement discretization unit 103 calculates representative values $dx_i, dy_i$ of dx(t) and dy(t) in the n divided sections to discretize the estimation result of the movement of the object, as in the case of the first example embodiment.

The signal divider 204 groups the radar signals $s(x_T, y_T, x_R, y_R, k)$ into n groups using the number of divisions n calculated by the movement discretizing unit 203 and the time of divisions $t_0, t_1, \ldots, t_n$ (step S204). The method of grouping is the same as in the first example embodiment.

The processing of steps S105 to S107 is the same as the processing in the first example embodiment.

In this example embodiment, since the radar device 200 divides the measurement period based on the movement of the object, it is possible to make an adjustment such as more finely dividing the time region where the movement is large. Thus, the accuracy of the discretization of the movement can be increased. As a result, the blurredness in the radar image is further suppressed.

Example Embodiment 3

Figure 10:
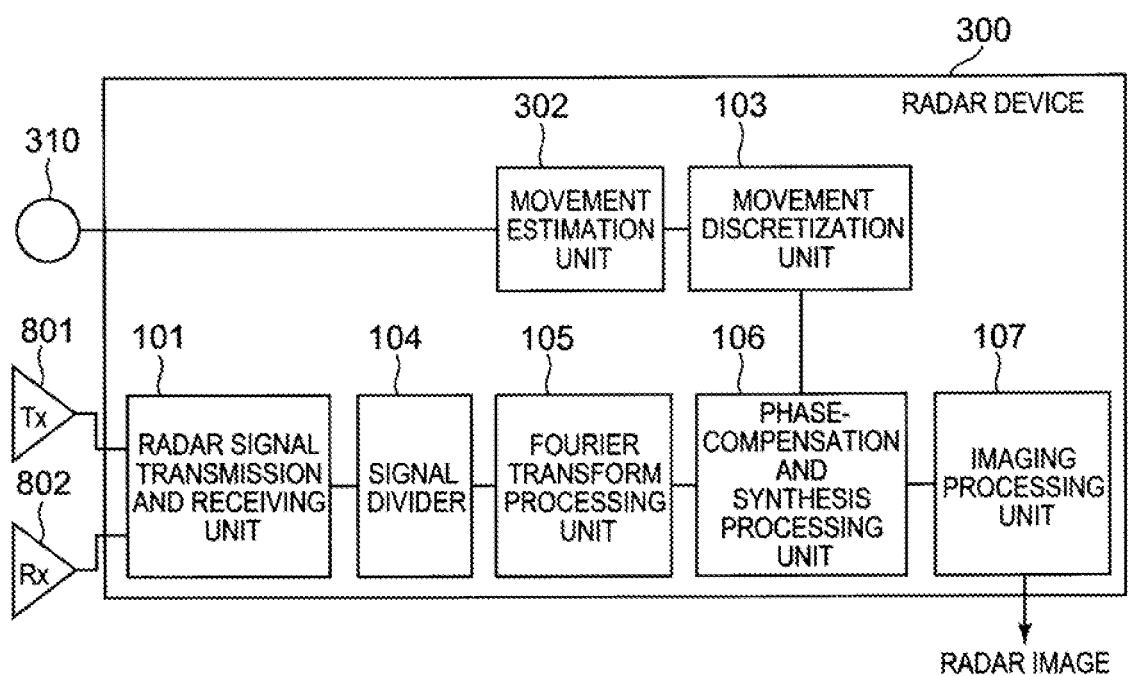
FIG. 10 It depicts a block diagram showing a configuration example of the radar device of the third example embodiment.

FIG. 10 is a block diagram showing a configuration example of the radar device of the third example embodiment. The radar device 300 of the third example embodiment comprises a radar signal transmission and receiving unit 101 that controls the transmission antenna 801 and inputs a radar signal from the receiving antenna 802, a movement estimation unit 302, the movement discretization unit 103 that discretizes the movement of an object, a signal divider 104 that divides the radar signal into a plurality of groups, a Fourier transform processing unit 105, a phase-compensation and synthesis processing unit 106, and an imaging processing unit 107.

The functions of the blocks other than the movement estimation unit 302 are the same as the functions in the first example embodiment.

A sensor 310 is connected to the radar device 300. The sensor 310 is a measuring instrument, such as a camera, that performs measurement of an object. The sensor 310 outputs a measurement result to the movement estimation unit 302 when the radar signal transmission and receiving unit 101 controls the transmission antenna 801 and inputs a radar signal from the receiving antenna 802. The sensor 310 is controlled to take pictures and the like in synchronization with the processing of the radar signal transmission and receiving unit 303. That is, the sensor 310 is controlled so that the detection signal including information at least as high as, and preferably higher in resolution than the radar signal based on the reflected wave received by the receiving antenna 802 is input to the movement estimation unit 302 at a timing synchronized with the obtainment timing of the radar signal. Note that, it is possible to configure the movement estimation unit 302 so that the movement estimation unit 302 can control such synchronization, but as another example, the synchronization may be performed by a control unit not shown in FIG. 10. In the case where such a control unit is provided, when the plurality of transmission antennas 801 are regarded as one group, the control unit may give instructions for starting the irradiation of electromagnetic waves to the group.

The movement estimation unit 302 estimates the movement of the object from the detection signals of the sensor 310, and outputs the estimated results dx(t) and dy(t) of the movement of the object to the movement discretization unit 103. In the case where a camera capable of continuous image capturing is used as the sensor 310, for example, the movement estimation unit 302 calculates time-series information (position, speed, etc.) of the object between the image capturing time using a method based on the optical flow described in non-patent literature 2, etc., for each pair of two consecutive images. The movement estimation unit 302 estimates the movement of the object from the calculated time-series information of the movement to obtains the estimation results dx(t) and dy(t).

The movement estimation unit 302 can also receive the output from the radar signal transmission and receiving unit 101 as in the case of the first example embodiment, and estimate the movement of the object using the output thereof together with the detection signal of the sensor 310. For example, the movement estimation unit 302 can estimate the movement of the object from the radar signals using the method used in the first example embodiment, and correct the estimation result by the detection signals of the sensor 310.

Figure 11:
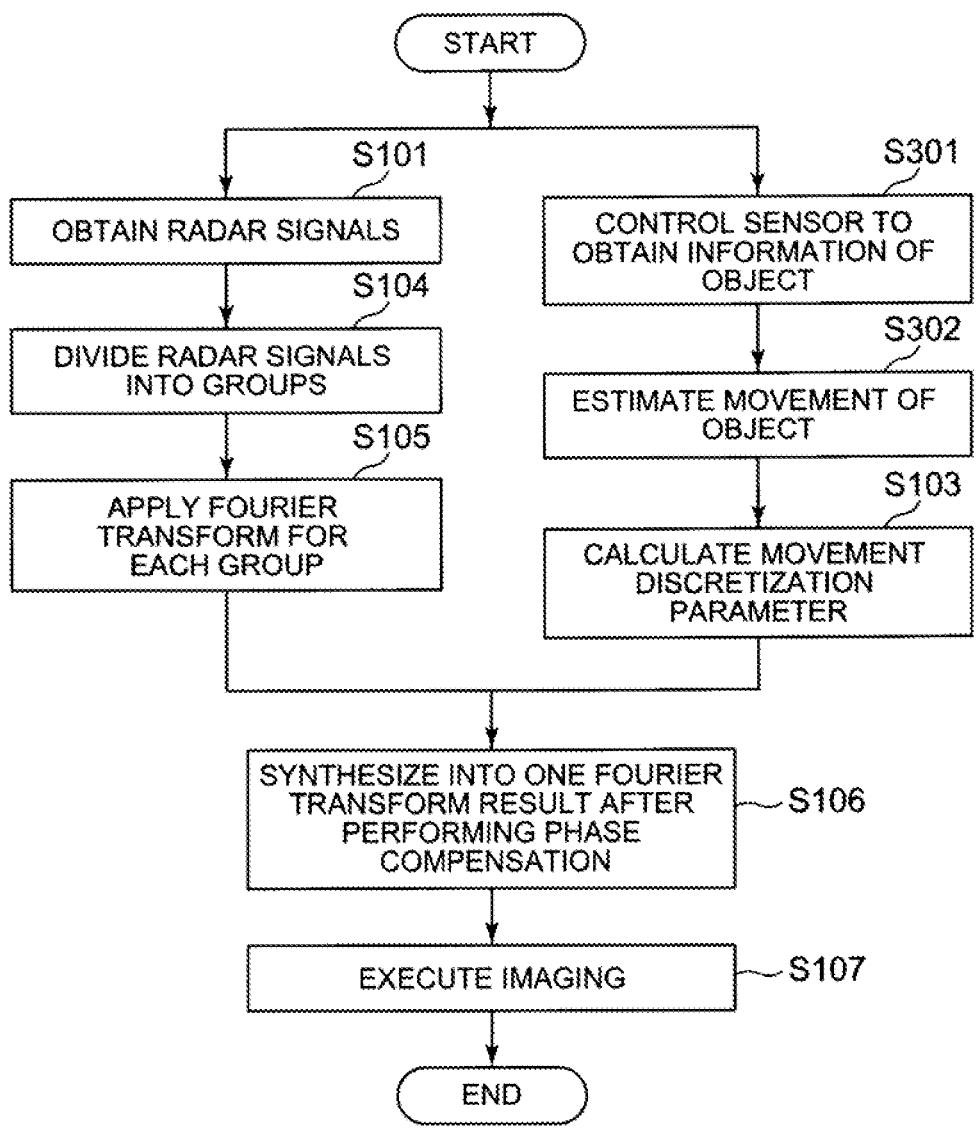
FIG. 11 It depicts a flowchart showing the operation of the radar device of the third example embodiment.

Next, the operation of the radar device 300 will be described with reference to the flowchart of FIG. 11. The processing of steps S101, S104, and S105 is the same as the processing in the first example embodiment.

The movement estimation unit 302 controls the sensor 310 to obtain detection signals of the object from the sensor 310 when the processing of steps S101, S104, and S105 is being performed (step S301).

The movement estimation unit 302 estimates the movement of the object based on the detection signals received from the sensor 310 to obtain the estimation results dx(t) and dy(t) (step S302). The method of estimating the movement is the same as the method of estimation in the first example embodiment, although the input source of the information is different.

The processing of steps S103, S106 and S107 is the same as the processing in the first example embodiment.

In this example embodiment, it is possible to improve the accuracy of the movement estimation of the movement estimation unit 302 in the radar device 300. For example, when a camera capable of continuous imaging is used, the camera can generally achieve a higher frame rate than the radar. Therefore, a large number of sample points can be collected. In addition, optical images generally have higher resolution than radar images. Therefore, in this example embodiment, it is possible to obtain higher accuracy than in the case of performing motion estimation using a radar signal. On the other hand, the radar image has advantages not found in general optical images, such as including three-dimensional information. Therefore, the accuracy of the movement estimation can be further improved by combining both the radar signals and the detection signals of a sensor such as a camera.

Example Embodiment 4

Figure 12:
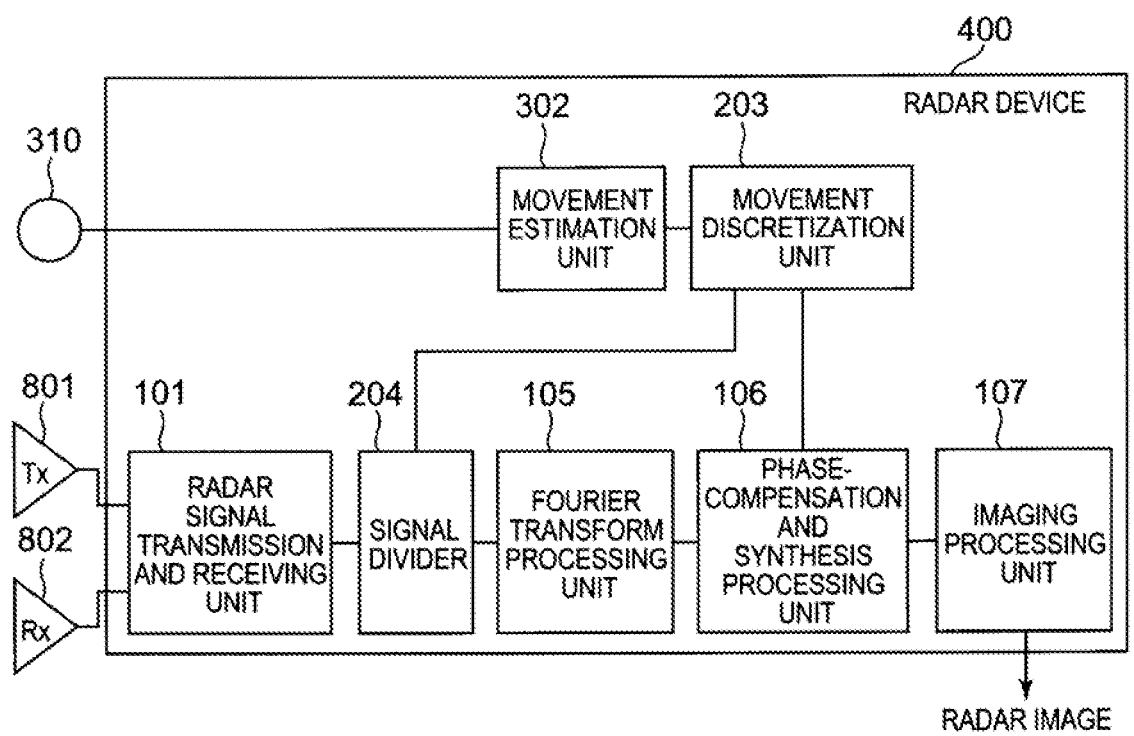
FIG. 12 It depicts a block diagram showing a configuration example of the radar device of the fourth example embodiment.

FIG. 12 is a block diagram showing a configuration example of the radar device of the fourth example embodiment. The radar device 400 of the fourth example embodiment comprises a radar signal transmission and receiving unit 101 that controls the transmission antenna 801 and inputs a radar signal from the receiving antenna 802, a movement estimation unit 302, a movement discretization unit 203 that discretizes the movement of an object, a signal divider 204 that divides the radar signal into a plurality of groups, a Fourier transform processing unit 105, a phase-compensation and synthesis processing unit 106, and an imaging processing unit 107.

The functions of the blocks other than the movement estimation unit 302 are the same as the functions in the second example embodiment (refer to FIG. 6).

The function of the movement estimation unit 302 is the same as the function in the third example embodiment. That is, the movement estimation unit 302 estimates the movement of the object from the detection signals of the sensor 310, and outputs the estimated results dx(t) and dy(t) of the movement of the object to the movement discretization unit 103.

Figure 13:
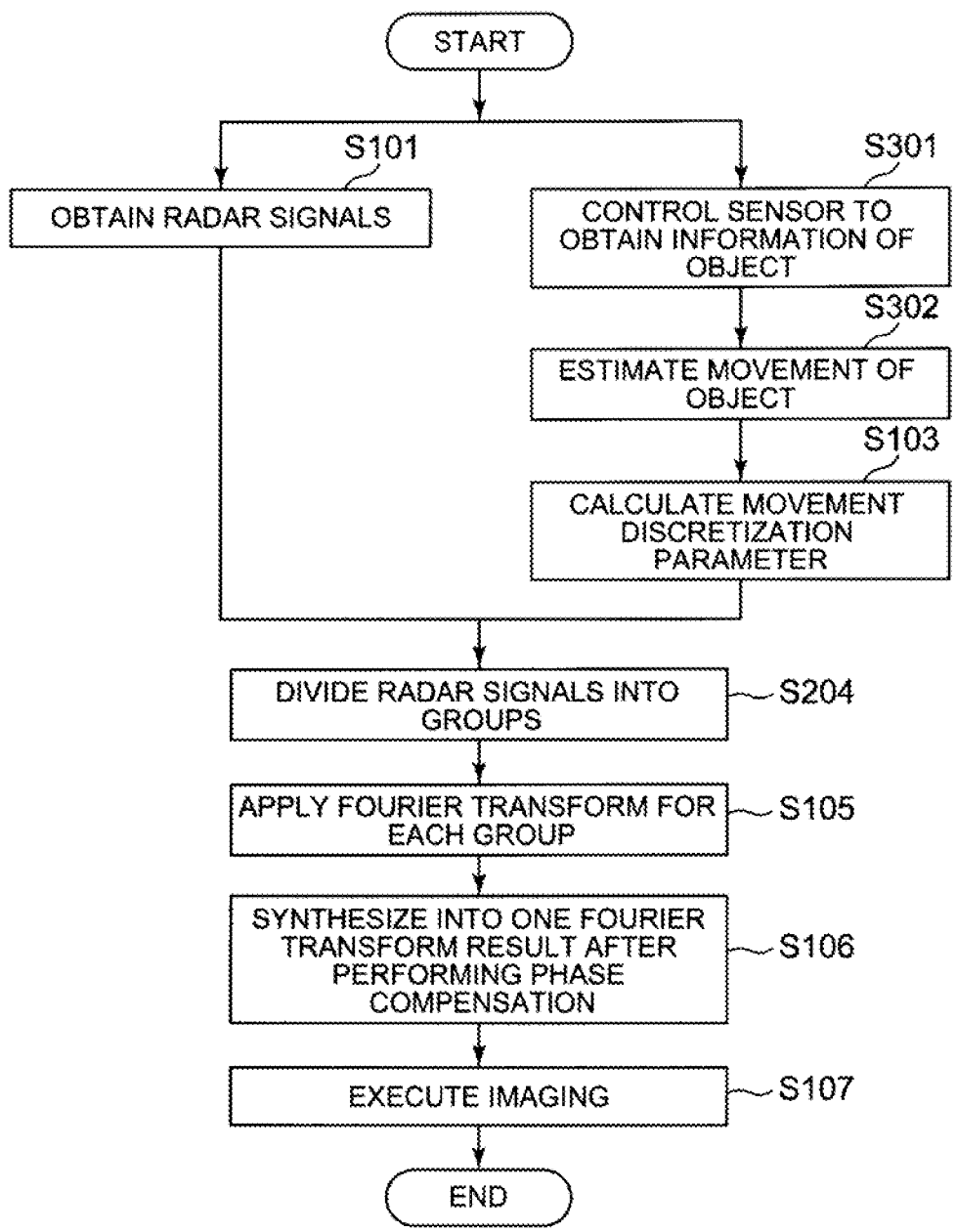
FIG. 13 It depicts a flowchart showing the operation of the radar device of the fourth example embodiment.

Next, the operation of the radar device 400 will be described with reference to the flowchart of FIG. 13.

Figure 8:
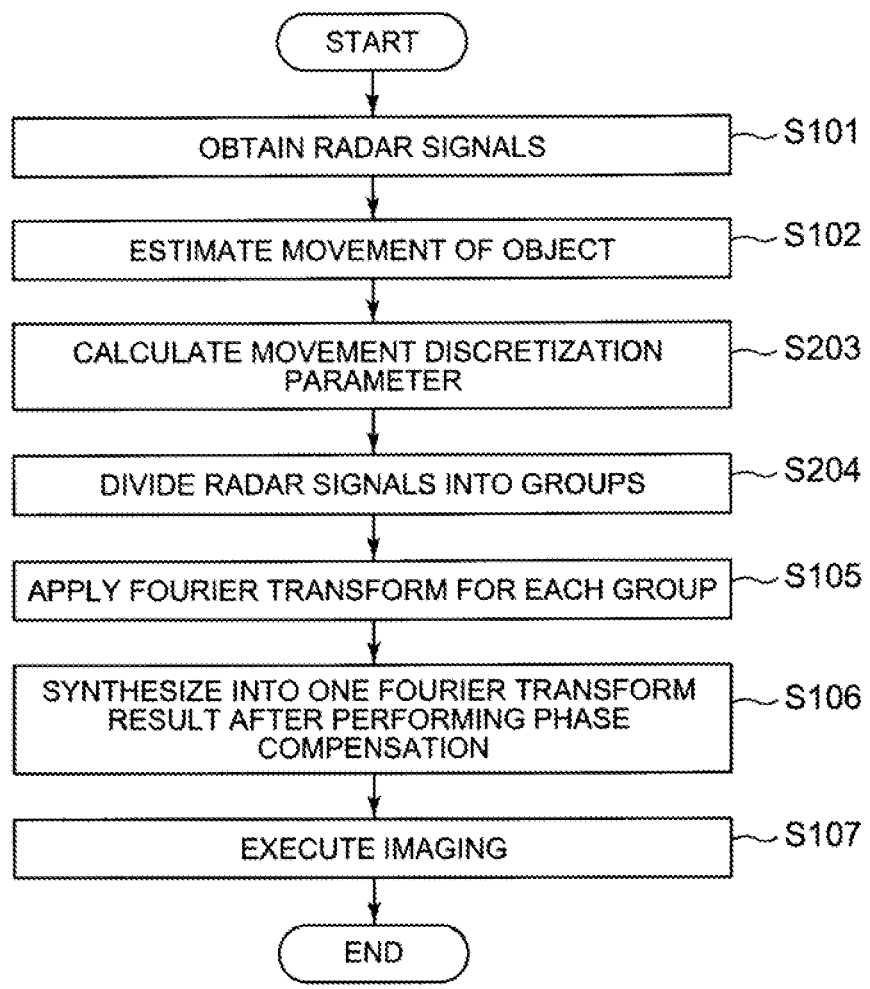
FIG. 8 It depicts a flowchart showing the operation of the radar device of the second example embodiment.

The processing of step S101 is the same as the processing in the second example embodiment (refer to FIG. 8). The processing of steps S301, S302, and S103 is the same as the processing in the third example embodiment (refer to FIG. 11).

In step S204, the signal divider 204 groups the radar signals $s(x_T, y_T, x_R, y_R, k)$ into n groups using the number of divisions n and the time of divisions $t_0, t_1, \ldots, t_n$ calculated by the movement discretization unit 203, as in the case of the second example embodiment.

The processing of steps S105 to S107 is the same as the processing in the second example embodiment (refer to FIG. 8).

Since this example embodiment corresponds to an example embodiment in which the second example embodiment and the third example embodiment are combined, the radar device 400 has both effects in the second example embodiment and in the third example embodiment.

The functions (processes) in each of the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 14:
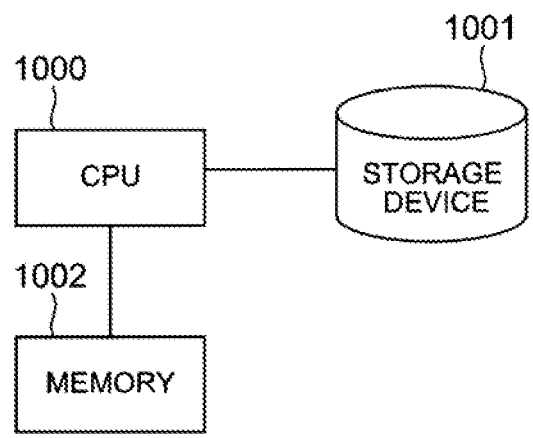
FIG. 14 It depicts a block diagram showing an example of a computer with a CPU.

FIG. 14 is a block diagram showing an example of a computer with a CPU. The computer is implemented in a radar device. The CPU 1000 executes processing in accordance with a program stored in a storage device 1001 to realize the functions in the above example embodiments. That is, the computer realizes the functions of the radar signal transmission and receiving unit 101, the movement estimation unit 102, 302, the movement discretization unit 103, 203, the signal divider 104, 204, the Fourier transform processing unit 105, the phase-compensation and synthesis processing unit 106 and imaging processing unit 107 in the radar devices 100, 200, 300, and 400 shown in FIGS. 1, 6, 10, and 12.

A graphics processing unit (GPU) may be used in place of or together with the CPU 1000. In addition, some of the functions in the radar devices 100, 200, 300, and 400 shown in FIGS. 1, 6, 10, and 12 may be realized by the semiconductor integrated circuit, and other portions may be realized by the CPU 1000 or the like.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk), magneto-optical storage media (for example, magneto-optical disc), compact disc-read only memory (CD-ROM), compact disc-recordable (CD-R), compact disc-rewritable (CD-R/W), and a semiconductor memory (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 15:
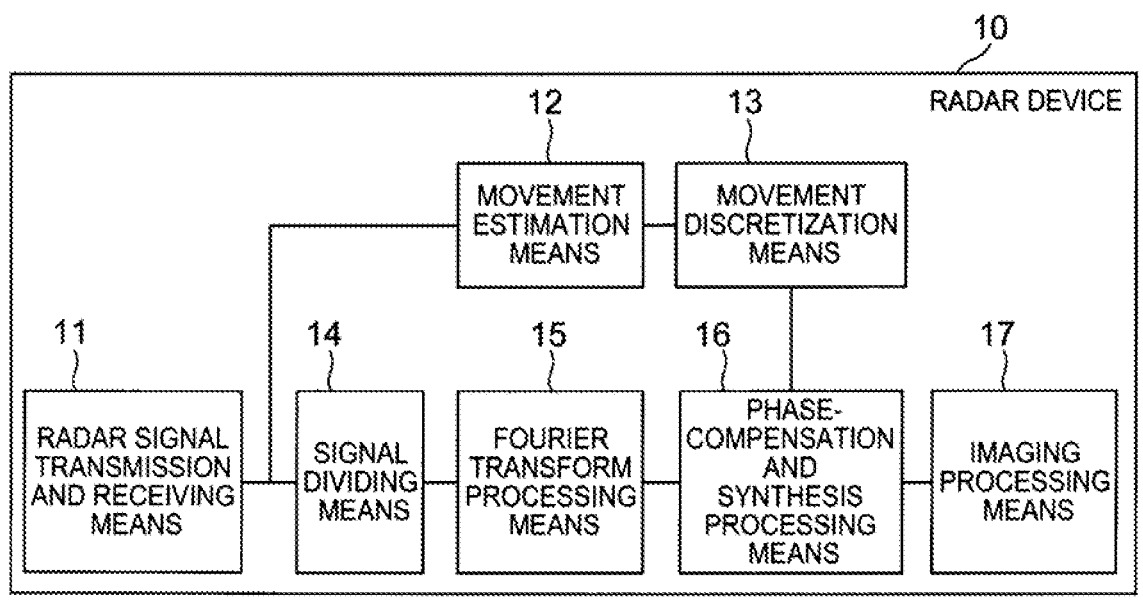
FIG. 15 It depicts a block diagram showing the main part of the radar device.

FIG. 15 is a block diagram showing the main part of the radar device. The radar device 10 shown in FIG. 15 comprises radar signal transmission and receiving means 11 (in the example embodiments, realized by the radar signal transmission and receiving unit 101) for obtaining radar signals, based on reflected waves received by a plurality of receiving antennas, movement estimation means 12 (in the example embodiments, realized by the movement estimation unit 102, 302) for estimating a movement of an object that may appear in a radar image, movement discretization means 13 (in the example embodiments, realized by the movement discretization unit 103, 203) for discretizing the estimated movement, signal dividing means 14 (in the example embodiments, realized by signal divider 104, 204) for dividing the radar signals into a plurality of groups, Fourier transform processing means 15 (in the example embodiments, realized by the Fourier transform processing unit 105) for applying Fourier transform to the radar signals of each of the groups, phase-compensation and synthesis processing means 16 (in the example embodiments, realized by the phase-compensation and synthesis processing unit 106) for synthesizing results of the Fourier transform after performing phase compensation corresponding to the movement of the object on the results of the Fourier transform, and imaging processing means 17 (in the example embodiments, realized by the imaging processing unit 107) for generating the radar image from the synthesized result of the Fourier transform.

A part of or all of the above example embodiments may also be described as, but not limited to, the following supplementary notes.

(Supplementary note 1) A radar device comprising:
radar signal transmission and receiving means for obtaining radar signals, based on reflected waves received by a plurality of receiving antennas,
movement estimation means for estimating a movement of an object that may appear in a radar image,
movement discretization means for discretizing the estimated movement,
signal dividing means for dividing the radar signals into a plurality of groups,
Fourier transform processing means for applying Fourier transform to the radar signals of each of the groups,
phase-compensation and synthesis processing means for synthesizing results of the Fourier transform after performing phase compensation corresponding to the movement of the object on the results of the Fourier transform, and
imaging processing means for generating the radar image from the synthesized result of the Fourier transform.

(Supplementary note 2) The radar device according to Supplementary note 1, wherein
the movement estimation means estimates the movement of the object from the radar signals.

(Supplementary note 3) The radar device according to Supplementary note 1, wherein
the movement estimation means estimates the movement of the object from detection signals of a sensor means capable of recognizing the object.

(Supplementary note 4) The radar device according to Supplementary note 1, wherein
the movement estimation means estimates the movement of the object using the radar signals and detection signals of a sensor means capable of recognizing the object.

(Supplementary note 5) The radar device according to any one of Supplementary notes 1 to 4, wherein
the movement discretization means discretizes the movement of the object estimated by the movement estimating means into the movement for each divided section, during a measurement period, determined by the measurement period and a plurality of predetermined time of divisions.

(Supplementary note 6) The radar device according to any one of Supplementary notes 1 to 4, wherein
the movement discretization means determines time of divisions, based on a displacement of the movement of the object in a measurement period, and discretizes the movement of the object estimated by the movement estimation means into the movement of each divided section in the measurement period determined by the time of divisions.

(Supplementary note 7) The radar device according to Supplementary note 5 or 6, wherein
the signal dividing means groups the radar signals with each of the divided sections used by the movement discretization means as a group.

(Supplementary note 8) The radar device according to any one of Supplementary notes 1 to 7, wherein
the phase-compensation and synthesis processing means performs the phase compensation, based on the movement of the object discretized by the movement discretization means.

(Supplementary note 9) An imaging method comprising:
obtaining radar signals, based on reflected waves received by a plurality of receiving antennas,
estimating a movement of an object that may appear in a radar image,
discretizing the estimated movement,
dividing the radar signals into a plurality of groups,
applying Fourier transform to the radar signals of each of the groups,
synthesizing results of the Fourier transform after performing phase compensation corresponding to the movement of the object on the results of the Fourier transform, and
generating the radar image from the synthesized result of the Fourier transform.

(Supplementary note 10) The imaging method according to Supplementary note 9, wherein
the movement of the object is estimated from the radar signals.

(Supplementary note 11) The imaging method according to Supplementary note 9, wherein
the movement of the object is estimated from detection signals of a sensor means capable of recognizing the object.

(Supplementary note 12) The imaging method according to Supplementary note 9, wherein
the movement of the object is estimated using the radar signals and detection signals of a sensor means capable of recognizing the object.

(Supplementary note 13) The imaging method according to any one of Supplementary notes 9 to 12, wherein
the estimated movement of the object is discretized into the movement for each divided section, during a measurement period, determined by the measurement period and a plurality of predetermined time of divisions.

(Supplementary note 14) The imaging method according to one of Supplementary notes 9 to 12, wherein
time of divisions is determined, based on a displacement of the movement of the object in a measurement period, and the estimated movement of the object is discretized into the movement of each divided section in the measurement period determined by the time of divisions.

(Supplementary note 15) The imaging method according to Supplementary note 13 or 14, wherein
the radar signals are grouped into groups, with each of the divided sections used to discretize the estimated motion as a group.

(Supplementary note 16) The imaging method according to any one of Supplementary notes 9 to 15, wherein
the phase compensation is performed, based on the discretize movement of the object.

(Supplementary note 17) An imaging program causing a computer to execute:
a process of obtaining radar signals, based on reflected waves received by a plurality of receiving antennas,
a process of estimating a movement of an object that may appear in a radar image,
a process of discretizing the estimated movement,
a process of dividing the radar signals into a plurality of groups,
a process of applying Fourier transform to the radar signals of each of the groups,
a process of synthesizing results of the Fourier transform after performing phase compensation corresponding to the movement of the object on the results of the Fourier transform, and
a process of generating the radar image from the synthesized result of the Fourier transform.

(Supplementary note 18) The imaging program according to Supplementary note 17, causing the computer to execute a process of estimating the movement of the object from the radar signals.

(Supplementary note 19) The imaging program according to Supplementary note 17, causing the computer to execute
a process of estimating the movement of the object from detection signals of a sensor means capable of recognizing the object.

(Supplementary note 20) The imaging program according to Supplementary note 17, causing the computer to execute
a process of estimating the movement of the object using the radar signals and detection signals of a sensor means capable of recognizing the object.

(Supplementary note 21) The imaging program according to any one of Supplementary notes 17 to 20, causing the computer to execute
a process of discretizing the estimated movement of the object into the movement for each divided section, during a measurement period, determined by the measurement period and a plurality of predetermined time of divisions.

(Supplementary note 22) The imaging program according to any one of Supplementary notes 17 to 20, causing the computer to execute
a process of determining time of divisions, based on a displacement of the movement of the object in a measurement period, and discretizing the estimated movement of the object into the movement of each divided section in the measurement period determined by the time of divisions.

(Supplementary note 23) The imaging method according to Supplementary note 21 or 22, causing the computer to execute
a process of grouping the radar signals into groups, with each of the divided sections used to discretize the estimated motion as one group.

(Supplementary note 24) The imaging method according to any one of Supplementary notes 17 to 23, causing the computer to execute
a process of performing the phase compensation, based on the discretized movement of the object.

While the present invention has been explained with reference to the example embodiments, the present invention is not limited to the aforementioned example embodiments.

Various changes understandable to those skilled in the art within the scope of the present invention can be made to the structures and details of the present invention.

REFERENCE SIGNS LIST

11 Radar signal transmission and receiving means
12 Movement estimation means
13 Movement discretization means
14 Signal dividing means
15 Fourier transform processing means
16 Phase-compensation and synthesis processing means
17 Imaging processing means
10, 100, 200, 300, 400 Radar device
101 Radar signal transmission and receiving unit
102, 302 Movement estimation unit
103, 203 Movement discretization unit
104, 204 Signal divider
105 Fourier transform processing unit
106 Phase-compensation and synthesis processing unit
107 Imaging processing unit
310 Sensor
801 Transmission antenna
802 Receiving antenna
1000 CPU
1001 Storage device
1002 Memory

What is claimed is:

1. A radar device comprising:
a radar signal transmission and receiving unit which obtains radar signals, based on reflected waves received by a plurality of receiving antennas,
a movement estimation unit which estimates a movement of an object that may appear in a radar image,
a movement discretization unit which discretizes the estimated movement,
a signal dividing unit which divides the radar signals into a plurality of groups,
a Fourier transform processing unit which applies Fourier transform to the radar signals of each of the groups,
a phase-compensation and synthesis processing unit which synthesizes results of the Fourier transform after performing phase compensation corresponding to the movement of the object on the results of the Fourier transform, and
an imaging processing unit which generates the radar image from the synthesized result of the Fourier transform.

2. The radar device according to claim 1, wherein
the movement estimation unit estimates the movement of the object from the radar signals.

3. The radar device according to claim 1, wherein
the movement estimation unit estimates the movement of the object from detection signals of a sensor capable of recognizing the object.

4. The radar device according to claim 1, wherein
the movement estimation unit estimates the movement of the object using the radar signals and detection signals of a sensor capable of recognizing the object.

5. The radar device according to claim 1, wherein
the movement discretization unit discretizes the movement of the object estimated by the movement estimating unit into the movement for each divided section, during a measurement period, determined by the measurement period and a plurality of predetermined time of divisions.

6. The radar device according to claim 1, wherein
the movement discretization unit determines time of divisions, based on a displacement of the movement of the object in a measurement period, and discretizes the movement of the object estimated by the movement estimation unit into the movement of each divided section in the measurement period determined by the time of divisions.

7. The radar device according to claim 5, wherein
the signal dividing unit groups the radar signals with each of the divided sections used by the movement discretization unit as a group.

8. The radar device according to claim 1, wherein
the phase-compensation and synthesis processing unit performs the phase compensation, based on the movement of the object discretized by the movement discretization unit.

9. An imaging method comprising:
obtaining radar signals, based on reflected waves received by a plurality of receiving antennas,
estimating a movement of an object that may appear in a radar image,
discretizing the estimated movement,
dividing the radar signals into a plurality of groups, applying Fourier transform to the radar signals of each of the groups, synthesizing results of the Fourier transform after performing phase compensation corresponding to the movement of the object on the results of the Fourier transform, and generating the radar image from the synthesized result of the Fourier transform.

10. The imaging method according to claim 9, wherein the movement of the object is estimated from the radar signals.

11. The imaging method according to claim 9, wherein the movement of the object is estimated from detection signals of a sensor capable of recognizing the object.

12. The imaging method according to claim 9, wherein the movement of the object is estimated using the radar signals and detection signals of a sensor capable of recognizing the object.

13. A non-transitory computer readable information recording medium storing an imaging program causing a computer to execute:

obtaining radar signals, based on reflected waves received by a plurality of receiving antennas, estimating a movement of an object that may appear in a radar image, discretizing the estimated movement, dividing the radar signals into a plurality of groups, applying Fourier transform to the radar signals of each of the groups, synthesizing results of the Fourier transform after performing phase compensation corresponding to the movement of the object on the results of the Fourier transform, and generating the radar image from the synthesized result of the Fourier transform.

14. The information recording medium according to claim 13, wherein the imaging program causes the computer to execute estimating the movement of the object from the radar signals.

15. The information recording medium according to claim 13, wherein the imaging program causes the computer to execute estimating the movement of the object from detection signals of a sensor capable of recognizing the object.

16. The information recording medium according to claim 13, wherein the imaging program causes the computer to execute estimating the movement of the object using the radar signals and detection signals of a sensor capable of recognizing the object.

* * * * *